United States Patent [19]

Covey

[11] Patent Number: 4,905,931
[45] Date of Patent: Mar. 6, 1990

[54] ARC SUPPRESSION AROUND FASTENERS

[75] Inventor: James H. Covey, Snohomish, Wash.

[73] Assignee: The Boeing Company, Seattle, Wash.

[21] Appl. No.: 157,902

[22] Filed: Feb. 18, 1988

[51] Int. Cl.[4] .............................................. H05F 1/02
[52] U.S. Cl. .................................... 244/1 A; 411/377;
244/132; 361/117; 361/218
[58] Field of Search ...................... 244/129.1, 121, 132,
244/133, 135 R, 1 A; 411/371, 372, 373, 376,
377; 361/117, 218

[56] References Cited
U.S. PATENT DOCUMENTS

| 1,399,942 | 12/1921 | Dowd | 411/376 |
|---|---|---|---|
| 3,420,477 | 1/1969 | Howard | 244/129.1 |
| 3,470,787 | 10/1969 | Mackie | 411/373 |
| 3,548,704 | 12/1970 | Kutryk . | |
| 3,930,432 | 1/1976 | Puchy | 411/376 |
| 4,382,049 | 5/1983 | Hofmeister et al. | 244/1 A |
| 4,582,462 | 4/1986 | Thiel . | |
| 4,630,168 | 12/1986 | Hunt | 244/1 A |
| 4,631,887 | 12/1986 | Francovitch | 411/373 |
| 4,681,497 | 7/1987 | Berecz | 244/132 |
| 4,755,904 | 7/1988 | Brick . | |
| 4,760,493 | 7/1988 | Pearson | 244/1 A |

FOREIGN PATENT DOCUMENTS

| 1085586 | 7/1960 | Fed. Rep. of Germany . | |
|---|---|---|---|
| 2067509 | 8/1971 | France | 411/373 |
| 527930 | 10/1940 | United Kingdom . | |
| 645114 | 10/1950 | United Kingdom . | |

OTHER PUBLICATIONS

10th International Aerospace and Ground Conference on Lighting and Static Electricity, Jun. 1985, R. O. Brick, pp. 149-155.

Primary Examiner—Sherman D. Basinger
Assistant Examiner—Stephen P. Avila
Attorney, Agent, or Firm—Seed and Berry

[57] ABSTRACT

A volume of gas is enclosed by a cap around a fastener that is through a composite structure on an aircraft. The gas provides spark suppression for arcing that may occur between the composite structure and the metal fastener during a lightning strike. The volume of gas is sufficiently large to absorb the energy of small, very hot particles of graphite, epoxy, etc., that may be present resulting from arcing. High-pressure gas regions between the fastener and composite member vent to the larger volume of gas and are absorbed. This provides effective spark suppression for particular areas in an aircraft, such as a fuel tank, etc.

13 Claims, 1 Drawing Sheet

ARC SUPPRESSION AROUND FASTENERS

STATEMENT OF GOVERNMENT INTEREST

The U.S. Government has certain rights in this invention.

TECHNICAL FIELD

This invention relates to a device for the suppression of electrical sparks, and more particularly, to an enclosure placed around a fastener to prevent electrical sparks from igniting flammable material or vapors.

BACKGROUND ART

Composite materials are increasingly being used in aircraft structures. Composite material is used in wing panels, attachments to fuel tanks of the aircraft, etc. Composite material has the advantage of being light in weight and having good strength characteristics.

A composite material such as graphite/epoxy includes a surface region made of an electrically insulating material and an inner region that has a much lower conductivity than metal at room temperature. Composite members are fastened to each other and to metal members using metal bolts. Electric charge travels on and in the composite member and arcs from the composite member to the metal fastener if the current density exceeds the current carrying ability of the joint.

Arcing from the composite member to metal is particularly dangerous when the arcing results from a lightning strike. A lightning strike may have up to 200,000 amps at 200,000 volts though it lasts for a very short period of time. When lightning strikes the aircraft, a large charge is placed on the composite member. When the charge arcs from the composite member to a metal fastener tremendous energy is expended in a short period of time. This energy includes heat energy that heats up the air around the arc. The composite member is also heated, sometimes turning small particles of the composite material into gas instantaneously. Small particles of the composite material or metal fastener are also heated to glowing hot and broken off of the composite member. The energy of the lightning strike and associated heat and pressure buildup is often sufficient to eject these small particles, in the form of glowing sparks, several feet from the arcing location.

In the event the arcing is occurring near a fuel tank, it is important to keep the sparks from igniting the fuel or any fuel vapors.

One solution is to place a dielectric barrier over the fastener and encapsulate the arcing interfaces of the fastener with the dielectric barrier, as taught in U.S. Pat. No. 4,382,049. This solution adds considerable weight to the aircraft, given the many thousands of metal fasteners. It is also very costly and time-consuming.

DISCLOSURE OF THE INVENTION

It is an object of this invention to provide an enclosure around the composite member and fastener interface having a relatively large volume of gas to contain sparks.

It is another object of this invention to provide an airtight enclosure of a sufficiently large volume that the air is not heated sufficiently to create high pressure when arcing occurs.

It is another object of this invention to provide a void around a fastener that is sufficiently large to absorb the pressure buildup from a smaller void to prevent a spark from being ejected several feet away from the smaller void.

These and other objects of the invention are accomplished by providing an electrically insulating, sealed enclosure attached to a composite member and enclosing a fastener. The enclosure is spaced from the fastener and provides a volume of gas around the fastener and composite member interface to absorb energy from the arcing. The volume of gas is large compared to the energy from the spark and the amount of time the spark exists. When arcing occurs from the composite structure to the fastener, the enclosed volume of air absorbs the high air pressure and spark with a very small change in pressure and temperature of the air volume. This provides containment of the spark and suppression of arcs so that they do not extend away from the fastener.

BEST MODE FOR CARRYING OUT THE INVENTION

Figure 1:
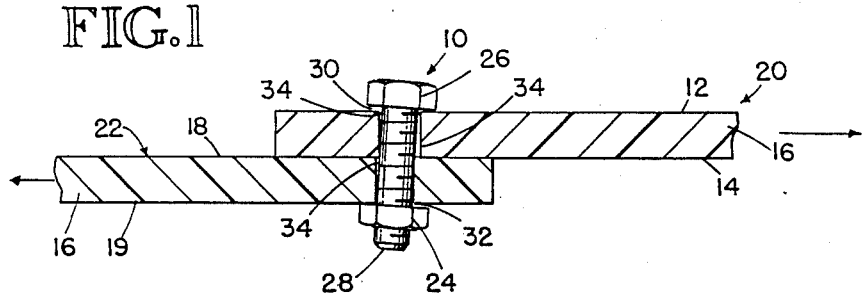
FIG. 1 is a partial cross-sectional view of a fastener through two composite members without using the inventive cap.

A fastener 10, such as a threaded bolt, attaches two composite members 20 and 22 together, as shown in FIG. 1. A load on the composite members tends to pull each member in opposite directions, as shown by the arrows in FIG. 1. The forces acting on the composite members create small voids between the fastener and the composite member. Similar voids may also exist if no load is on the fastener. These voids may be between the head of the bolt 26 and the surface 12, such as void 30 shown in FIG. 1. Similarly, a void 32 may be formed between the surface 19 and the nut 24. Voids 34 may also be formed between the bolt shaft 28 and the composite member.

Arcing may occur from the surface 12 to the bolt head 26 through void 30. Similarly, arcing may occur between the nut 24 and the surface 19 across void 32. When the carbon or epoxy is converted to gas from solid, a void is created, even though there may have been no void or a very small void previously. The arcing results from the current density exceeding the current carrying ability of the joint between the fastener and the composite structure. The arcing can occur even if no voids are present. Arcing also occurs between the composite member inner regions 16 and 17 to the shaft 28 across void 34. These voids are usually filled with air. The voids are very small. When an arc occurs across the void, the volume of air in the void is heated rapidly to a very high temperature, near that of the arc temperature. In the event the void is very small, this creates a very high air pressure in the void. The hot gases under high pressure is expelled out of the void with great force. The arcing often has sufficient energy and a high enough temperature that very small particles of the carbon or epoxy are turned from solid to gas instantaneously, further increasing the high pressure in the void.

Often, small particles of the metal, carbon or epoxy are heated to a very high temperature and then break off from the structure at the site of the arc. The spark includes these particles that are glowing hot. They are ejected with considerable energy by high gas pressure out of the void.

The spark, including the glowing hot particles, may be thrown a considerable distance out of the void, up to two or three feet, depending on the size of the void, gas pressure buildup, size of the particle, etc. The particle remains sufficiently hot while being expelled to ignite fuel or flammable material. This is very dangerous if the arcing or spark occurs in the gas vapors of a fuel tank, near electrical wiring, flammable cargo, etc.

Figure 2:
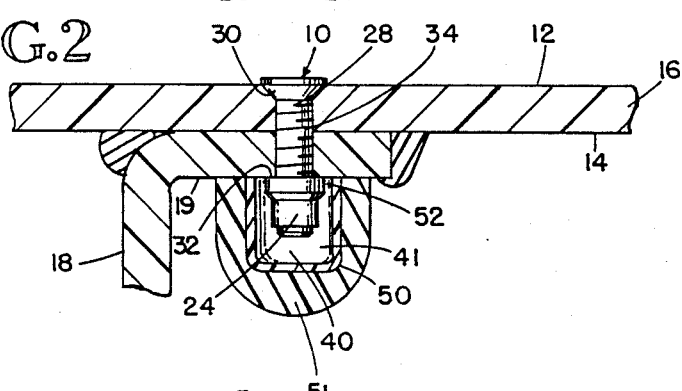
FIG. 2 is a partial cross-sectional view of a fastener having only one end enclosed by the inventive cap.

According to the invention, a plastic cap 50 is affixed to the composite member 22 at the surface 19 and is placed over the end of the fastener to enclose a volume of air gases 41 in void 40, as shown in FIG. 2. The cap encloses a volume of air surrounding the interface between the composite member 22 and the fastener 10. A polysulphide rubber fuel tank sealant 51 or other suitable sealant is provided around the cap 50. The rubber sealant 51 further ensures that an airtight seal round the void 40 exists at all times during the life of the aircraft. The plastic cap 50 is spaced from the fastener and does not contact it at any location. Space 52 exists around the periphery of the fastener between the cap and the fastener along the surface 19 of the composite member. The void 40 is filled with a gas 41, of known volume, around the fastener and nut to provide the arc suppression characteristics of this invention.

The fastener shown in FIG. 2 is of the type in which the nut is in a spark-free area, such as a fuel tank, and the head is in a "spark-permitted" area. The head of the bolt 26 extends outside the fuel tank and is not covered with the cap 50 of the present invention.

The arcing that occurs between the fastener and the composite material is enclosed by the gas volume 41 within cap 50. The amount of pressure developed in the void is proportional to the volume and heating of the gas by the spark. The time that an arc is present is very short, so the time during which the gas heats up and high pressure develops is very short. With a relatively large volume of gas 41, the gas temperature rises very little and subsequently there is little or no pressure buildup. The gas 41 in void 40 is compressible and is coupled to the air-filled voids between the fastener and the composite member. By absorbing the high-pressure gas venting from the small-volume void, such as 34, the large volume of gas in void 40 prevents the spark from being expelled outward, away from the fastener. The spark, hot gases and heated particles of epoxy, carbon, titanium, etc., are thus suppressed and kept within the cap 50 rather than ejected several inches or feet outward by the high-pressure gas in the smaller void.

The effect of the high-temperature arcing on the voids, whether small void 34 or large void 40, can be determined using the ideal gas formula:

$$pV = nRT, \qquad (1)$$

where p is the pressure, v is the volume, n is of moles of gas, R is the universal gas constant, and T is the temperature. For a very small void, having a very small volume of gas, the pressure buildup is very high for a given change in temperature. The gas 41 in void 40, enclosed by cap 50, provides a very large volume relative to the change in temperature during the time the arc between the composite member and fastener occurs, such that only a small change in pressure occurs. If the volume of gas 41 is made too small, the gas pressure increase will be sufficient to blow the cap 50 off the composite member. The volume of gas in void 40 must be sufficiently large to keep the temperature and pressure change in the gas 41 as a whole very low.

The change in the temperature for the gas volume in void 40 as a whole can be determined from the formula:

$$Q = \rho V C_p \Delta T, \qquad (2)$$

giving:

$$\Delta T = Q/\rho V C_p, \qquad (3)$$

where Q is the heat generated, $\rho$ is the density of gas, $C_p$ is the heat capacity of the gas, V is the volume of the gas 41 in void 40, and $\Delta T$ is the change in temperature of the gas in void 40. Assuming the gas in the void is air at standard temperature and pressure, $\rho$ equals 0.075 lb/ft$^3$, $C_p$ equals 0.24 BTU/lb-° F., and Q has been determined by various tests to be $4.74 \times 10^{-6}$ BTU for arcing when the fastener is titanium and the composite is a graphite/epoxy. Using these values in formula (3), the following equation is given:

$$\Delta T = 0.455/V, \qquad (4)$$

with the volume of air in void 40 being in inches cubed. For a volume of 0.25 in$^3$, the rise in temperature of the air is 1.82° F. This rise in temperature is absorbed in part by the plastic cap 50 and rubber sealant 51 such that the temperature rise in the air vapors of the fuel tank is very low and is well within the acceptable range. The pressure rise in void 40, as given by formula (1), $pV = nRT$, with T being 1.82° F. higher and the volume being constant, is very low. The gas in void 40, together with cap enclosure 50 and rubber sealant 51, provides the spark suppression. The gas volume absorbs the high temperature energy of the small particles such that the plastic cap is not burned.

The volume of void 40 may be made larger if desired; for example, a volume of 0.5 in$^3$ yields a temperature rise of 0.91° F. However, cap 50 must be made larger to provide the larger volume, which adds extra weight. With a smaller cap, the volume of void 40 may be so small that high pressure builds up and "blows" the cap off the composite structure. For example, with a volume of 0.01 in$^3$, the temperature rise is 45.5° F., and with a void volume of 0.001 in$^3$, the temperature rise is 455.04° F., both of which are unacceptably high. The resulting pressure increase from high-temperature increases is also unacceptable. The preferred size of void 40 is that which will provide a volume of air in the range of 0.15 in$^3$ to 0.3 in$^3$ at standard temperature and pressure for quarter-inch titanium fasteners with a graphite/epoxy material.

The air volume size in void 40 is based on graphite/epoxy composite material, with standard air as the gas. In the event a different gas is used, the volume of gas required to absorb the temperature and pressure increase will vary but may be determined as described herein.

The air volume in void 40 is based on graphite/epoxy composite material. The composite member may be fiberglass, foam or other material including electrically insulating materials. In the event a different composite material is used, the volume of gas required will vary.

Figure 3:
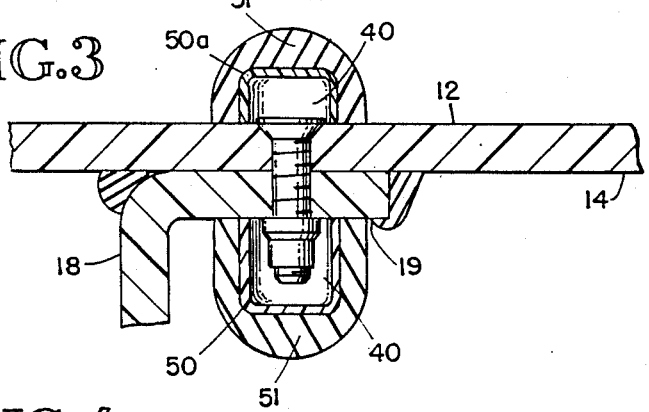
FIG. 3 is a partial cross-sectional view of a fastener having both ends enclosed.

The size of the cap 50 to provide void 40 is determined according to the required volume of air. Allowance must be made for the extension of the fastener 10 into the area enclosed by the cap 50. If the fastener 10 and nut 2 extend well into the cap, then the cap 50 must be made larger to ensure that the necessary volume of air is enclosed in void 40, as is shown in FIG. 3. If the fastener does not extend into the cap, then the cap can be made somewhat smaller and still provide the same volume of air, as shown by cap 50a of FIG. 3 being smaller than cap 50.

The space 52 around the fastener is provided to ensure that the voids between the composite material and the fastener vent to the large volume of air in void 40. The voids between the nut and the composite structure are very small, and venting to the large air volume enclosed by the cap 50 ensures that the overall change in gas pressure is low.

The operation and arc suppression characteristic caps 50 and 50a, as shown in FIG. 3, are identical to those shown and described with respect to FIG. 2. In the embodiment of FIG. 3, the protective caps provide the void over both ends of the fastener to suppress the sparks.

Figure 4:
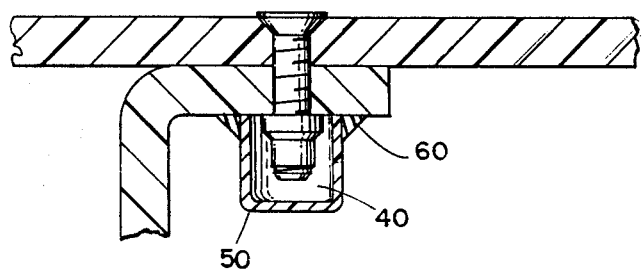
FIG. 4 is an alternative embodiment for connecting the cap to the structure.

The embodiment of FIG. 4 uses the cap 50 without use of a rubber sealant. The cap is held to the surface 19 of the composite member 22 by a suitable adhesive 60. The cap without the rubber sealant provides the advantages of this invention as described previously with respect to FIG. 2. The embodiment of FIG. 4 is significantly lighter in weight than the rubber-enclosed embodiment of FIG. 2. The rubber is used to protect the cap from corrosive fuel vapors or other materials. However, the cap 50 may be made from a noncorrosive material if desired, or placed in an area where corrosive fuel does not contact the cap. The cap may also be made of fire resistant material.

The cap 50 is sealed with an airtight seal to the composite member. This ensures that no heated particles or sparks are expelled and the volume of air at any altitude is always large enough to cool the gas and particles. It is possible to provide an air vent in cap 50 for certain aircraft if desired; however, air vents to cap 50 should not be provided in spark-free areas such as fuel tanks.

I claim:

1. A spark containment apparatus comprising:
   a first member of composite material which includes a material that changes phase from solid to gas at temperatures below 1000° F.;
   a second member of composite material which includes a material that changes phase from solid to gas at temperatures below 1000° F.;
   a fastener extending through said first member and into said second member for connecting said first and second members together, said fastener being electrically conductive; and
   an electrically insulating enclosure attached to said first member in an airtight, sealed relationship and spaced from said fastener to provide a gas-filled void between said fastener and said enclosure.

2. The apparatus according to claim 1 wherein said gas in said void has a volume in the range of 0.15 in$^3$ to 0.3 in$^3$.

3. The apparatus according to claim 2 wherein said gas is air at standard temperature and pressure.

4. The apparatus according to claim 1 wherein said gas in said void includes a volume such that a temperature rise of less than 2° F. will occur due to electrical arcing and according to the formula:

$$\Delta T = Q/\rho V C p.$$

5. The apparatus according to claim 1, further including an electrically insulating enclosure attached to said second member in an airtight, sealed relationship and spaced from said fastener, providing a gas-filled void between said fastener and said enclosure.

6. The apparatus according to claim 1, further including a rubber sealant surrounding said enclosure to protect said enclosure from corrosive materials.

7. In an aircraft structure having a composite member attached to a second member with a metal fastener, a portion of said fastener extending through said composite member and projecting from a surface of said composite member, the improvement comprising:
   attaching an electrically insulating enclosure to said surface with an airtight seal to enclose a volume of gas surrounding said portion of said fastener to suppress electrical arcing between said composite member and said fastener, and said composite member including a material which changes phase from solid to gas at temperatures below those possibly present on an aircraft structure during a lightning strike.

8. The apparatus according to claim 7 wherein said fastener is plastic.

9. The apparatus according to claim 7 wherein said composite member includes graphite and epoxy.

10. The apparatus according to claim 7 wherein said composite member includes fiberglass 11. The apparatus according to claim 7, further including a rubber sealant surrounding said enclosure.

12. The apparatus according to claim 7 wherein said second member is a metal member.

13. The apparatus according to claim 7 wherein said surface is inside a fuel tank of an aircraft.

* * * * *